(12) United States Patent
Kim

(10) Patent No.: US 6,955,460 B2
(45) Date of Patent: Oct. 18, 2005

(54) LCD BACKLIGHT UNIT HAVING 40° HALF POWER ANGLE WITHOUT A POLARIZING SHEET

(75) Inventor: Jae Bum Kim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/320,413

(22) Filed: Dec. 17, 2002

(65) Prior Publication Data

US 2003/0117791 A1 Jun. 26, 2003

(30) Foreign Application Priority Data

Dec. 26, 2001 (KR) ....................................... P2001-85382

(51) Int. Cl.⁷ ................................................. F21V 7/22
(52) U.S. Cl. ...................... 362/620; 362/619; 362/560; 362/615; 349/64; 349/65
(58) Field of Search ............................. 362/23, 26, 29, 362/31, 551, 558, 559, 560, 561; 349/56, 61, 62, 64, 65

(56) References Cited

U.S. PATENT DOCUMENTS

| | | | | |
|---|---|---|---|---|
| 5,598,280 A | * | 1/1997 | Nishio et al. ................. | 349/62 |
| 5,617,251 A | * | 4/1997 | Ohta et al. ..................... | 349/61 |
| 5,627,926 A | * | 5/1997 | Nakamura et al. ............ | 349/62 |
| 6,425,673 B1 | * | 7/2002 | Suga et al. .................... | 362/31 |
| 6,435,686 B1 | * | 8/2002 | Gotou et al. .................. | 362/31 |

FOREIGN PATENT DOCUMENTS

KR    1994-15537    7/1994

* cited by examiner

*Primary Examiner*—Alan Cariaso
*Assistant Examiner*—Ismael Negron
(74) *Attorney, Agent, or Firm*—McKenna Long & Aldridge LLC

(57) ABSTRACT

A backlight unit includes a light emission part having a lamp for emitting light beams and a lamp housing for mounting the lamp therein and for reflecting the light beams from the lamp; a light guide panel for guiding the light beams from the light emission part; a reflecting plate under the light guide panel for reflecting the light beams that progress to a lower surface and a side surface of the light guide panel; a diffusion sheet having a thickness of about 113 μm for diffusing the light beams that have passed through the light guide panel; and a prism sheet having a thickness of about 165 μm and having a half-power angle of at least about 40° for controlling progress directions of the light beams that have passed through the diffusion sheet.

10 Claims, 5 Drawing Sheets

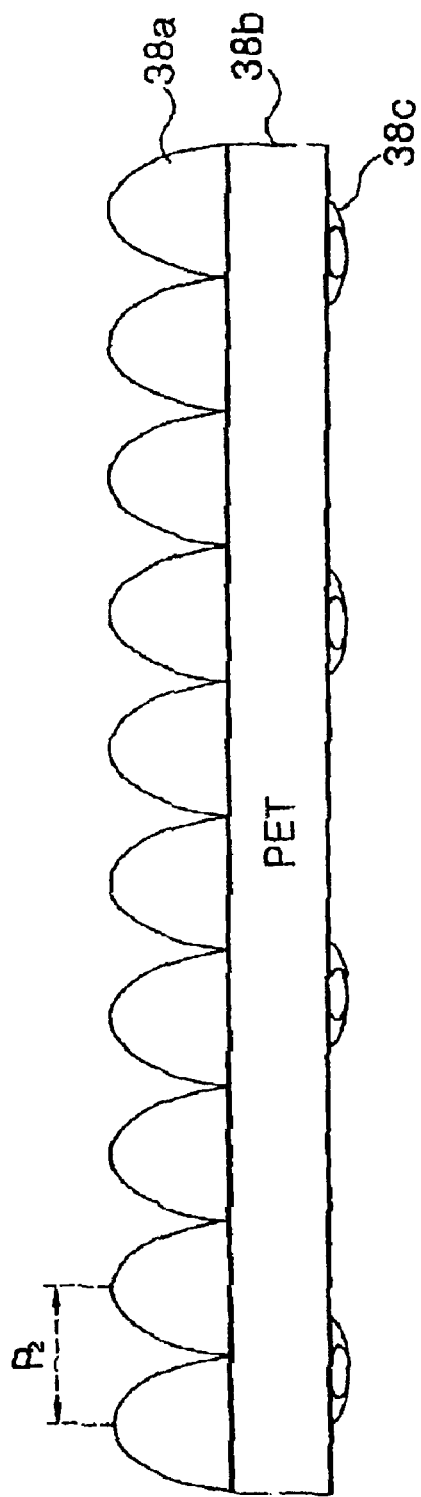

LCD BACKLIGHT UNIT HAVING 40° HALF POWER ANGLE WITHOUT A POLARIZING SHEET

This application claims the benefit of Korean Application No. P2001-85382, filed on Dec. 26, 2001 in Korea, which is hereby incorporated by reference.

BACKGROUND OF THE INVENTION

1. Field of the Invention

This invention relates to a liquid crystal display, and more particularly to a backlight unit that achieves a half-power angle of 40° without having a polarizing sheet.

2. Discussion of the Related Art

Generally, a liquid crystal display (LCD) controls the transmittance of light beams emitted from a backlight unit through a liquid crystal display panel. The liquid crystal display panel includes a plurality of liquid crystal cells arranged in a matrix and a plurality of control switches for supplying video signals to the corresponding liquid crystals cell in order to display a desired picture on a screen.

FIG. 1 is a side view schematically illustrating a backlight unit according to related art. Referring to FIG. 1, the related art backlight unit includes a light guide panel 4 guiding light beams from a light emission part; a reflecting plate 2 under the light guide panel 4 for reflecting, towards the upper surface, light beams that progress to the lower and side surfaces of the light guide panel 4; and a diffusion sheet 6 for diffusing the light beams that have passed through the light guide panel 4. The backlight unit further includes a prism sheet 8 for controlling the progress directions of the light beams that have passed through the diffusion sheet 6; and a polarizing sheet 10 for selectively transmitting the light beams that have passed through the prism sheet 8.

The light emission part includes a lamp 14 for generating light beams and a lamp housing 16 for mounting the lamp 14 and for reflecting the light beams from the lamp 14 towards the light guide panel 4. Substantially all of the light beams generated in the light emission part are directed towards the upper surface of the light guide panel 4 by utilizing the total reflection condition of the light beams that reach a printed pattern formed at the lower surface of the light guide panel 4. The light beams that have progressed to the lower surface and the side surface of the light guide panel 4 are reflected by the reflecting plate 2 to progress in the direction of the upper surface of the light guide panel 4. The light beams that have passed through the light guide panel 4 are diffused by a diffusion sheet 6.

The light beams incident to the liquid crystal display panel 12 will have a higher light efficiency when the incident direction is more perpendicular to the surface of the panel 12. For this purpose, the prism sheet 8 and the polarizing sheet 10 are deposited on the diffusion sheet 6 to make the light beams perpendicular to the surface of the liquid crystal display panel 12. As shown in FIG. 1, the light beams that have passed through the prism sheet 8 are incident on the liquid crystal display panel 12 via the polarizing sheet 10.

Because the polarizing sheet 10 is coated with a linear reflex polarizing material such as a double brightness enhancement film (DBEF) material, it can operate as a mirror in one condition, and operate as an image screen in another condition. The linear reflex polarizing material transmits substantially all of the linear polarized light components that are polarized in one direction (the transmitting direction) and reflects substantially all of the linear polarized light components that are polarized in a direction perpendicular the transmitting direction.

FIG. 2 is a detailed drawing of the related art prism sheet of FIG. 1. Referring to FIG. 2, the related art prism sheet 8 includes a condensing film 8b of polyester PET, and a lenticular layer 8a that extends in a specific direction on the upper surface of the condensing film 8b. The condensing film 8b is formed with its thickness 155 $\mu$m and the lenticular layer 8a is composed of a plurality of linear prisms. Each of the linear prisms has two inclined surfaces about an apex. The distance $P_1$ between the two adjacent two apexes (i.e., the pitch) is 50 $\mu$m, the apex angle $\theta$ between the two inclines is 90°.

In the related art backlight unit, however, due to the use of an expensive polarizing sheet, manufacturing costs and the number of the required processes are undesirably large.

SUMMARY OF THE INVENTION

Accordingly, the present invention is directed to a backlight unit that substantially obviates one or more of the problems due to limitations and disadvantages of the related art.

An object of the present invention to provide a backlight unit that achieves a half-power angle of about 40° without using a polarizing sheet.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, the present invention provides a backlight unit, including a light emission part having a lamp for emitting light beams and a lamp housing for mounting the lamp therein and for reflecting the light beams from the lamp; a light guide panel for guiding the light beams from the light emission part; a reflecting plate under the light guide panel for reflecting the light beams that progress to a lower surface and a side surface of the light guide panel; a diffusion sheet having a thickness of about 113 $\mu$m for diffusing the light beams that have passed through the light guide panel; and a prism sheet having a thickness of about 165 $\mu$m and having a half-power angle of at least about 40° for controlling progress directions of the light beams that have passed through the diffusion sheet.

The diffusion sheet may be a polyester film having a haze of about 81.4%, a spectral transmittance of about 64.5%, and a total ray transmittance of about 77.6%.

Also, the prism sheet may include a condensing film for condensing light beams; a lenticular layer extending in a specific direction on an upper surface of the condensing film; and a matte texture layer uniformly disposed on a lower surface of the condensing film for dispersing light beams.

Here, the lenticular layer may preferably include a plurality of dome-shape prisms arranged along a specific direction.

Further, an apex angle of each prism may preferably be set to about 90° and a pitch of the prisms may preferably be set to about 50 $\mu$m.

In another aspect, the present invention provides a backlight optical device to be coupled with a light emission part that emit light beams, the device including a light guide panel configured to guide the light beams from the light emission part; a reflecting plate under the light guide panel for reflecting the light beams that progress to a lower surface and a side surface of the light guide panel; a diffusion sheet having a thickness of about 113 μm for diffusing the light beams that have passed through the light guide panel; and a prism sheet having a thickness of about 165 μm and having a half-power angle of at least about 40° for controlling progress directions of the light beams that have passed through the diffusion sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 is an enlarged view of an example of a prism sheet in the backlight unit of FIG. 3.

DETAILED DESCRIPTION OF THE PREFERRED EMBODIMENT

Reference will now be made in detail to the preferred embodiments of the present invention, examples of which are illustrated in the accompanying drawings.

Figure 1:
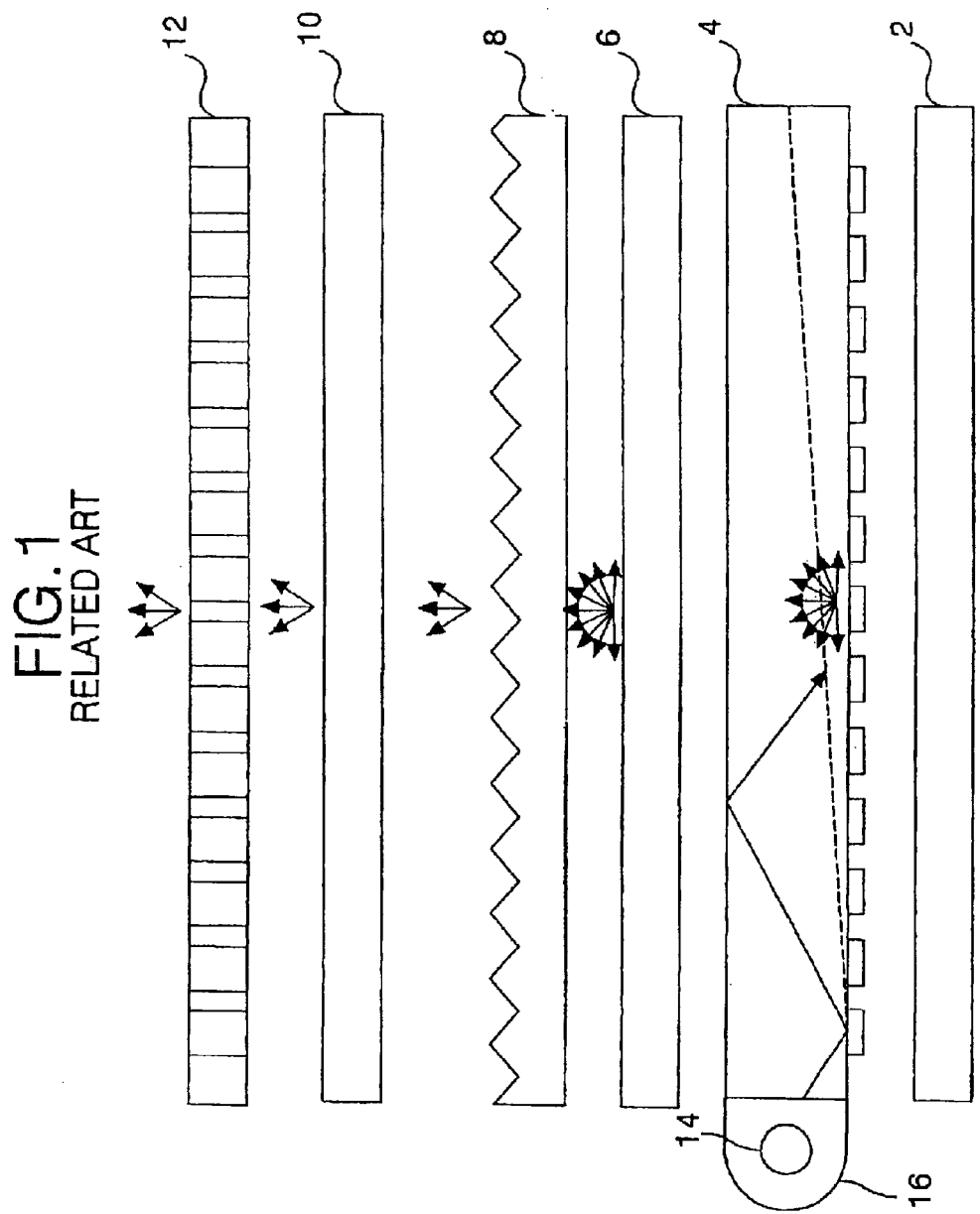
FIG. 1 is a cross-sectional view illustrating the structure of a related art backlight unit.
Figure 2:
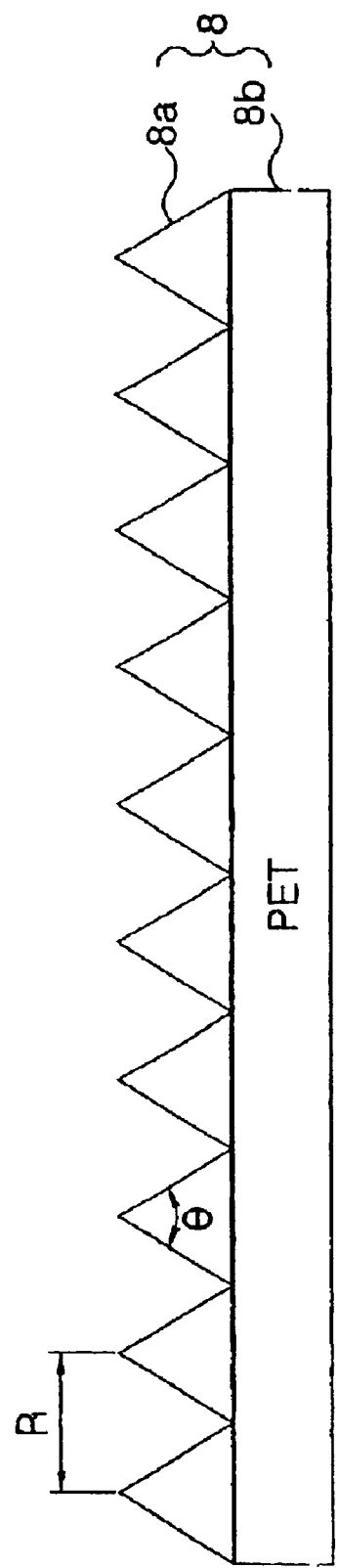
FIG. 2 is an enlarged view of a prism sheet in the backlight unit of FIG. 1.
Figure 3:
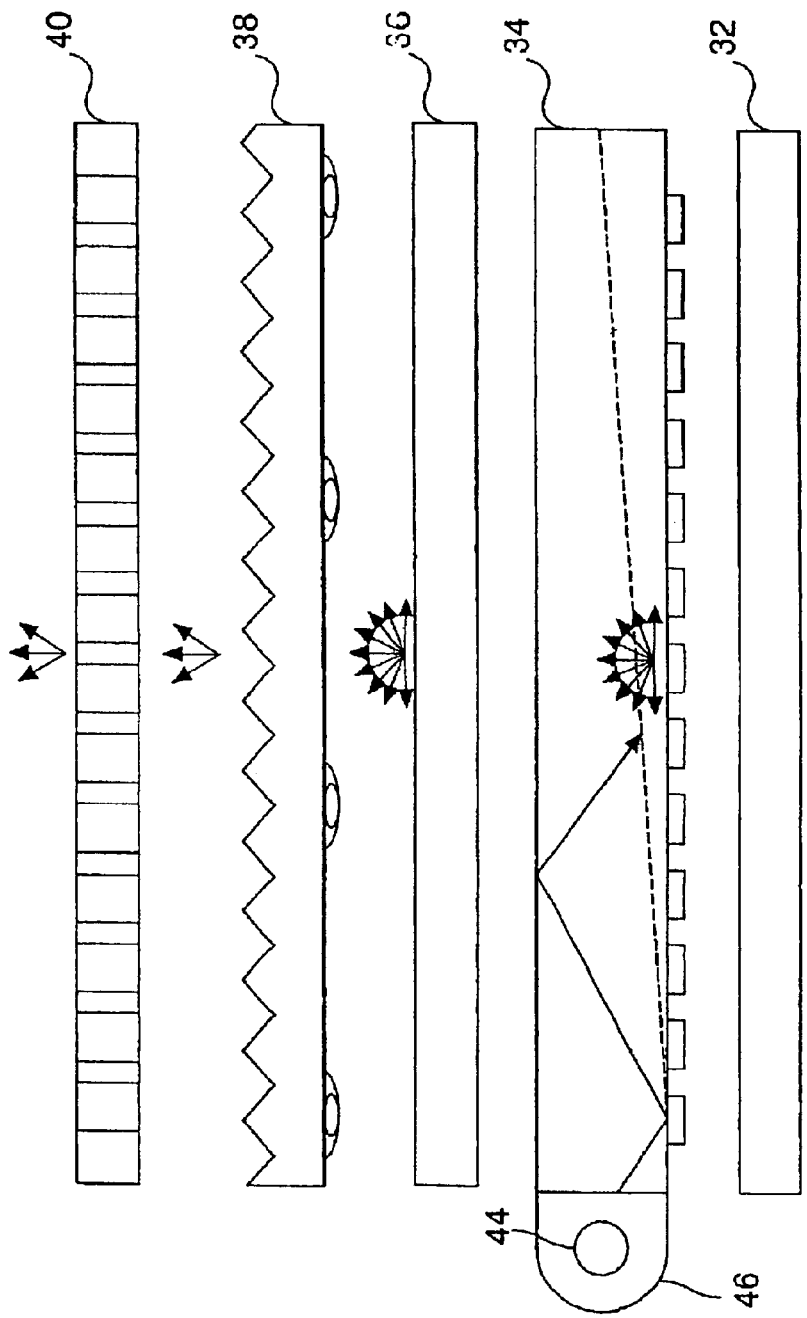
FIG. 3 is a cross-sectional view illustrating the structure of a backlight unit according to an embodiment of the present invention.

FIG. 3 shows a cross-section of a backlight unit according to an embodiment of the present invention. Referring to FIG. 3, the backlight unit includes a light guide panel 34 guiding light beams from a light emission part; a reflecting plate 32 under the light guide panel 34 for reflecting, to the upper surface, the light beams that progress towards the lower surface and side surfaces of the light guide panel 34, and a diffusion sheet 36 for diffusing the light beams that have passed through the light guide panel 34. The backlight unit further includes a prism sheet 38 for controlling the progress directions of the light beams that have passed through the diffusion sheet 36. The prism sheet 38 is configured to have a matte texture at the lower surface thereof. The matte surface reduces spectrum reflection; that is, it improves the dispersion of light.

The light emission part includes a lamp 44 for generating light beams and a lamp housing 46 for mounting the lamp 44 and for reflecting the light beams from the lamp 44 towards the light guide panel 34. Substantially all of the light beams generated in the light emission part are directed towards the upper surface of the light guide panel 34 by utilizing the total reflection condition of the light beams that reach a printed pattern formed at the lower surface of the light guide panel 34. The light beam that have progressed to the lower surface and the side surface of the light guide panel 34 are reflected by the reflecting plate 32 to progress towards the direction of the upper surface of the light guide panel 34. The light beams that have passed through the light guide panel 34 are diffused by a diffusion sheet 36.

The light beams incident to the liquid crystal display panel 40 have a higher light efficiency when the incident angle is more perpendicular to the surface of the panel 40. For this reason, the diffusion sheet 36 and the prism sheet 38 are formed to direct the light beams so that they become substantially perpendicular to the surface of the the liquid crystal display panel 40 before being incident on the panel 40. The light beams that have passed through the diffusion sheet 36 and the prism sheet 38 are incident on the liquid crystal display panel 40.

Figure 4:
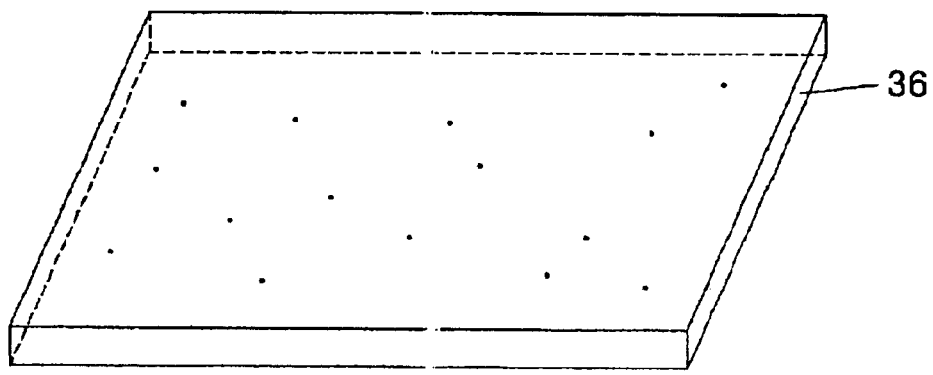
FIG. 4 is a projection view illustrating an example of a diffusion sheet in the backlight unit of FIG. 3.

FIG. 4 is a projection view of the diffusion sheet 36 of FIG. 3. The diffusion sheet 36 is coupled to the light transmission surface of the light guide panel 34. Referring to FIG. 4, the diffusion sheet 36 produces a more uniform brightness distribution by dispersing directions of the incoming light beams. A Polyester PET resin may be used as the material of the diffusion sheet 36, for example. The polyester PET resin has a good light diffusion property and is suitable for high brightness. To increase the surface diffusion capacity, a surface diffusion layer may be additionally provided on the polyester PET film after an adhesive treatment is carried out. The thickness of the diffusion sheet 36 is preferably about 113 μm, and its haze is preferably about 81.4%. Also, the spectral transmittance of the diffusion sheet 36 is preferably about 64.5%, and the total ray transmittance of the sheet 36 is preferably about 77.6%.

FIG. 5 is an enlarged view of the prism sheet 38 shown in FIG. 3. Referring to FIG. 5, the prism sheet 38 includes a condensing film 38b of polyester PET, a lenticular layer 38a that extends in a specific direction on the upper surface of the condensing film 38b, and a matte texture layer 38c uniformly formed on the lower surface of the condensing film 38b. The condensing film 38b is formed to have a thickness 155 μm, for example, and the lenticular layer 38a includes a plurality of dome-shaped prisms. Each of the dome-shaped prisms has two curved surfaces meeting at a top. The distance $P_2$ between the two adjacent tops (i.e., the pitch) is preferably about 50 μm, and the top angle θ formed by the two curved sides at the top is preferably about 90°.

The matte texture 38c improves the dispersion of light. With the above-described construction, the prism sheet 38 according to this example of the present invention has characteristics of condensing the light beam, transmitting substantially all of the linear polarized components of the light in one direction (the transmitting direction) and reflecting substantially all of the linear polarized components of light in a direction perpendicular to the transmitting direction. Accordingly, a backlight unit can be provided that achieves a half-power angle of about 40° without using a polarizing sheet.

As described above, the backlight unit of the present invention can achieve required characteristics without a polarizing sheet. Therefore, the backlight unit according to the present invention eliminates the need for the polarizing sheet in the backlight unit, thereby improving its light efficiency and reducing the manufacturing costs at the same time.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight optical device having a 40° half-power angle without a polarizing sheet and to be coupled with a light emission part that emit light beams, the device comprising:

a light guide panel configured to guide the light beams from the light emission part;

a reflecting plate under the light guide panel for reflecting the light beams that progress to a lower surface and a side surface of the light guide panel;

a diffusion sheet for diffusing the light beams that have passed through the light guide panel; and a prism sheet having a thickness of about 165 μm and having a matte texture layer uniformly disposed on a bottom surface of the prism sheet for controlling progress directions of the light beams that have passed through the diffusion sheet.

2. The device according to claim 1, wherein the diffusion sheet is a polyester film having a haze of about 81.4%, a spectral transmittance of about 64.5%, and a total ray transmittance of about 77.6%.

3. The backlight unit according to claim 1, wherein the prism sheet includes:

a condensing film for condensing light beams; and a lenticular layer extending in a specific direction on an upper surface of the condensing film, wherein the matte texture layer uniformly disposed on a lower surface of the condensing film for dispersing light beams.

4. The backlight unit according to claim 3, wherein the lenticular layer includes a plurality of dome-shape prisms arranged along a direction.

5. The backlight unit according to claim 4, wherein an apex angle of each prism is about 90° and a pitch of the prisms is about 50 μm.

6. A backlight unit having a 40° half-power angle without a polarizing sheet, comprising:

a light emission part having a lamp for emitting light beams and a lamp housing for mounting the lamp therein and for reflecting the light beams from the lamp;

a light guide panel for guiding the light beams from the light emission part;

a reflecting plate under the light guide panel for reflecting the light beams that progress to a lower surface and a side surface of the light guide panel;

a diffusion sheet for diffusing the light beams that have passed through the light guide panel; and a prism sheet having a matte texture layer uniformly disposed on a bottom surface of the prism sheet for controlling progress directions of the light beams that have passed through the diffusion sheet.

7. The backlight unit according to claim 6, wherein the diffusion sheet is a polyester film having a haze of about 81.4%, a spectral transmittance of about 64.5%, and a total ray transmittance of about 77.6%.

8. The backlight unit according to claim 6, wherein the prism sheet includes:

a condensing film for condensing light beams and;

a lenticular layer extending in a specific direction on an upper surface of the condensing film, wherein the matte texture layer is uniformly disposed on a lower surface of the condensing film for dispersing light beams.

9. The backlight unit according to claim 8, wherein the lenticular layer includes a plurality of dome-shape prisms arranged along a direction.

10. The backlight unit according to claim 9, wherein an apex angle of each prism is about 90° and a pitch of the prisms is about 50 μm.

* * * * *